United States Patent
Bukin et al.

(10) Patent No.: US 12,457,225 B1
(45) Date of Patent: Oct. 28, 2025

(54) SYSTEM AND METHOD FOR PASSIVE IDENTIFICATION AND DETECTION OF BOTNETS

(71) Applicant: Radware Ltd., Tel Aviv (IL)

(72) Inventors: Vladislav Bukin, Hod Hasharon (IL); Tom Mark, Tel Aviv (IL); Evgeny Fedoruk, Tel Aviv (IL); Namik Binyaminov, Or Akiva (IL); Nadav Shaoulian, Tel Aviv (IL); Nadav Spitzer, Jerusalem (IL); Shai Levi, Modiin (IL)

(73) Assignee: Radware, Ltd., Tel Aviv (IL)

( * ) Notice: Subject to any disclaimer, the term of this patent is extended or adjusted under 35 U.S.C. 154(b) by 0 days.

(21) Appl. No.: 18/964,871

(22) Filed: Dec. 2, 2024

(51) Int. Cl.
   *H04L 9/40*     (2022.01)

(52) U.S. Cl.
   CPC .................. *H04L 63/1416* (2013.01)

(58) Field of Classification Search
   CPC ....................................... H04L 63/1416
   USPC ........................................... 726/23
   See application file for complete search history.

(56) References Cited

U.S. PATENT DOCUMENTS

| | | | | |
|---|---|---|---|---|
| 8,555,388 | B1 * | 10/2013 | Wang | H04L 69/22 713/188 |
| 8,677,479 | B2 * | 3/2014 | Neystadt | G06F 21/552 726/25 |
| 9,444,835 | B2 * | 9/2016 | Thomas | H04L 63/1408 |
| 9,773,112 | B1 | 9/2017 | Rathor et al. | |
| 9,930,065 | B2 | 3/2018 | Nelms et al. | |
| 10,721,148 | B2 * | 7/2020 | Ravid | H04L 63/1425 |
| 11,843,622 | B1 * | 12/2023 | Tellez | H04L 63/1425 |
| 2010/0138377 | A1 * | 6/2010 | Wright | G06N 5/01 706/52 |
| 2017/0251005 | A1 * | 8/2017 | Niv | H04L 63/20 |
| 2017/0251016 | A1 * | 8/2017 | Niv | H04L 63/20 |
| 2018/0145978 | A1 | 5/2018 | Kim et al. | |
| 2018/0246552 | A1 | 8/2018 | Thompson et al. | |
| 2020/0021647 | A1 * | 1/2020 | Shieh | H04L 67/1044 |
| 2020/0366689 | A1 * | 11/2020 | Lotia | H04L 63/1483 |

* cited by examiner

*Primary Examiner* — Badri Narayanan Champakesan
(74) *Attorney, Agent, or Firm* — M&B IP Analysts, LLC

(57) ABSTRACT

A system and method for detecting botnets are provided. The method includes monitoring a network traffic to collect network data for a device; mapping the device to members of at least one stored botnet, wherein the mapping matches a network data of the device to network data of the members of the at least one stored botnet; determining the mapped device as a botnet device of an associated botnet upon matching the network data of the device to a network data of a member of the associated botnet, wherein the associated botnet is the at least one stored botnet; and logging the network data of the mapped device as being part of the at least one stored botnet.

16 Claims, 4 Drawing Sheets

SYSTEM AND METHOD FOR PASSIVE IDENTIFICATION AND DETECTION OF BOTNETS

TECHNICAL FIELD

The present disclosure relates generally to detecting malicious cyberattacks and more specifically, to detecting botnets in a network traffic.

BACKGROUND

The challenge of ensuring security and privacy for devices connected over the Internet has become increasingly difficult, while at the same time, becoming ever more important, as more private and sensitive information is being stored and accessed online. Cyber threats to the data of individuals, corporations, and governments are constantly evolving and becoming more complex. One prevalent threat currently being deployed is the execution of malicious code, or malware, which can include viruses, ransomware, rootkits, and the like.

Among the tools used to propagate such malware are malware bots. Bots are any computing device that may be used to execute a piece of code and are often used without the knowledge of the owners of the executing device. Multiple bots can be connected together to form a bot network, or a botnet, that can be controlled by a single malicious entity. These botnets can be connected and controlled over the Internet remotely and programmed to execute simple or complex tasks.

Recently, botnets have used the increased popularity of Internet of Things (IoT) devices, where traditionally non-Internet connected appliances and devices, such as microwaves, audio speakers, home security cameras, and the like, are now connected to the Internet for remote control and access. Such devices may be more vulnerable and accessible than secure devices and thus, readily employed as part of a botnet. Once compromised, these devices are used to carry out large-scale cyberattacks such as, but not limited to, Distributed Denial-of-Service (DDOS) attacks, credential stuffing, spamming, data theft, cryptojacking, and more. Some examples of data theft may include personal information, financial data, internet protocol (IP), login credentials, and more. Another common cyberattack from botnets is ransomware distribution by infecting large systems with malicious software through phishing emails, malicious websites, exploit kits, and more.

It has been identified that mitigation of botnet attacks requires a multifaceted approach that involves prevention, detection, and response strategies. Current techniques rely on data sources that provide lists of proxy devices, endpoints, and other network elements with reputation scores reflecting their legitimacy. Non-legitimate entities that are often part of "bad actor" groups may be identified as the origin of malicious transactions. Organizations apply access rules based on the list to block certain entities from accessing their network, services, and the like. However, detecting and maintaining such lists can be challenging and resource intensive, particularly, with the sophisticated and complex character of modern botnets. Moreover, mitigation rules may often only be triggered at specific conditions, for example, type of attack, and volume of attack, which create additional risks.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for detecting botnets. The method comprises: monitoring a network traffic to collect network data for a device; mapping the device to members of at least one stored botnet, wherein the mapping matches a network data of the device to network data of the members of the at least one stored botnet; determining the mapped device as a botnet device of an associated botnet upon matching the network data of the device to a network data of a member of the associated botnet, wherein the associated botnet is the at least one stored botnet; and logging the network data of the mapped device as being part of the associated botnet of the at least one stored botnet.

Certain embodiments disclosed herein also include a non-transitory computer readable medium having stored thereon causing a processing circuitry to execute a process, the process comprising: monitoring a network traffic to collect network data for a device; mapping the device to members of at least one stored botnet, wherein the mapping matches a network data of the device to network data of the members of the at least one stored botnet; determining the mapped device as a botnet device of an associated botnet upon matching the network data of the device to a network data of a member of the associated botnet, wherein the associated botnet is the at least one stored botnet; and logging the network data of the mapped device as being part of the associated botnet of the at least one stored botnet.

Certain embodiments disclosed herein also include a system for detecting botnets. The system comprises: a processing circuitry; and a memory, the memory containing instructions that, when executed by the processing circuitry, configure the system to: monitor a network traffic to collect network data for a device; map the device to members of at least one stored botnet, wherein the mapping matches a network data of the device to network data of the members of the at least one stored botnet; determine the mapped device as a botnet device of an associated botnet upon matching the network data of the device to a network data of a member of the associated botnet, wherein the associated botnet is the at least one stored botnet; and log the network data of the mapped device as being part of the associated botnet of the at least one stored botnet.

BRIEF DESCRIPTION OF THE DRAWINGS

The subject matter disclosed herein is particularly pointed out and distinctly claimed in the claims at the conclusion of the specification. The foregoing and other objects, features.

DETAILED DESCRIPTION

Figure 1:
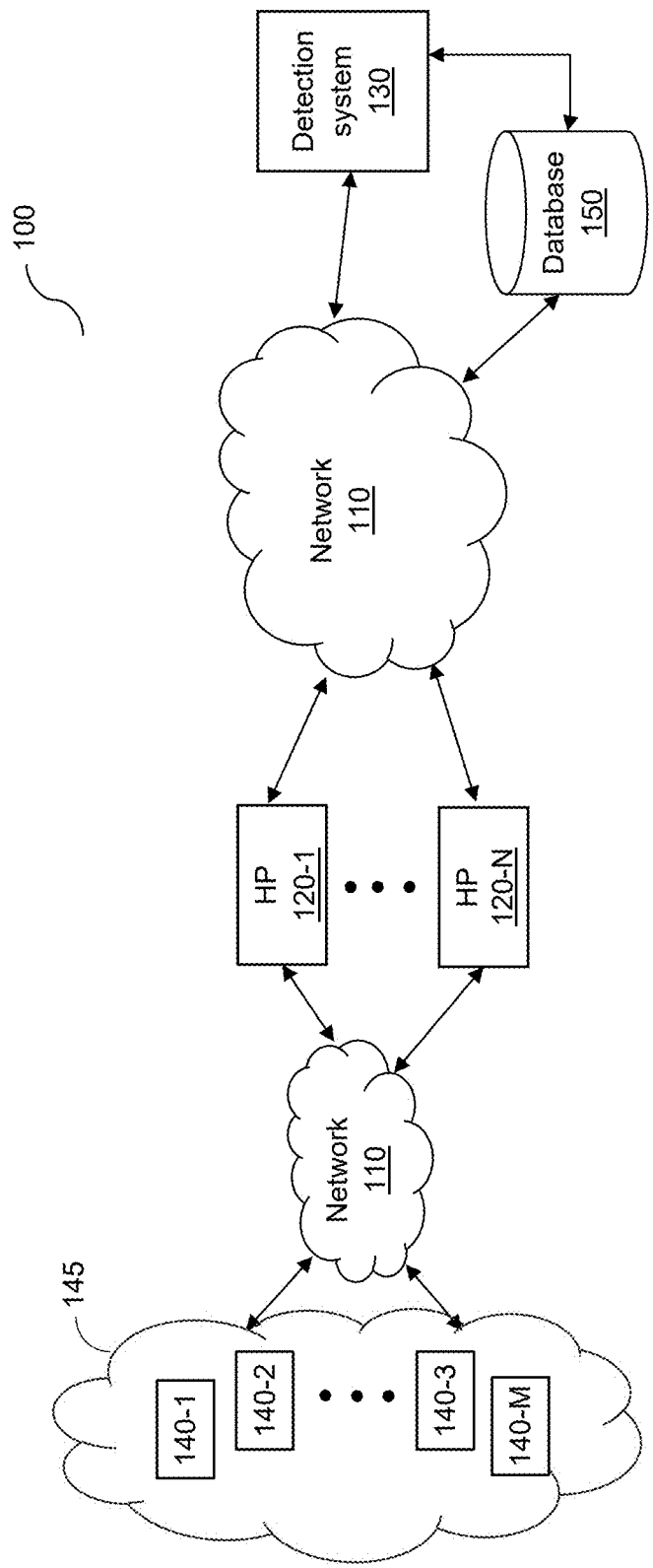
FIG. 1 is a network diagram utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for passive identification of botnet devices and early detection of a botnet activity. The early detection of the botnet activity enables predictions for potential botnet attacks from the identified botnets. The embodiments disclosed herein monitor network traffic from devices directed to a protective entity and/or entities in order to collect network data, which are mapped to the botnet data that are stored as part of a threat intelligence on botnets. A fractional or proportional identification of botnet devices in the network traffic is tracked to detect botnets and their activities being exploited. Such tracking and detection of botnet devices allow early detection of botnet activity, thereby enabling early and efficient onset of mitigations against botnet attacks. It should be noted that the detection of botnet activity is performed in real-time or near real-time as the botnet devices are observed in the network data, which reduces the detection time as well as response time to botnets for improved cybersecurity at the protected entities. It should be further noted that active seeking of potential botnets is not required, thereby reducing computational load at various systems.

Botnet activities can have various traffic characteristics (or behavior) that may be utilized for the identification of their activities as well as relevant botnet devices. However, these characteristics are not always consistent or simple to detect due to the large volume and unintended participation of the botnet devices in the malicious attack. The disclosed embodiments employ one or more behaviors to efficiently detect botnet activities and devices to conserve computational resources. One example traffic characteristic is that botnet attacks often begin with a small group of botnet devices spearheading a target entity, followed by a larger group of botnet devices for a "mass power" attack. The disclosed embodiments herein enable accurate and efficient detection of the small group of botnet devices of the spearhead before the botnet attack reaches its full force with "mass power." That is, the early detection and tracking of the botnet device enables mitigation such as, but not limited to, generating a notification, blocking at least a portion of the network traffic, and the like before detrimental damage is made to the protected entity. That way, the malicious security impact from the botnet activity is reduced. In addition, the amount and time to monitor, process, and identify botnets may be reduced.

The embodiments disclosed herein utilize honeypots to lure and discover botnets in the network. The honeypots are segregated from the protected entities thereby eliminating potential risks in attracting potentially malicious entities. Such configuration of honeypots requires less orchestration of the protected entities' infrastructure thereby reducing traffic and operational costs. The honeypots are configured to continuously communicate with various incoming traffic in order to collect network data, including that of botnets, without bias. These network data are processed to discover botnets and their devices to deepen the threat intelligence. It should be noted that the collection of network data is passively performed by the honeypot without interfering or being affected by the botnets.

Furthermore, the embodiments disclosed herein utilize similar startup times as indicators for botnet devices. It has been identified that legitimate entities start connections as needed and may be randomly distributed at a wide range. However, botnet devices are often activated as groups and will initiate communications within a smaller time frame. For example, hundreds of devices in a botnet may startup at a similar time at a time resolution of minutes. The clustered analysis of devices enables efficient detection with high accuracy.

FIG. 1 is an example network diagram 100 utilized to describe the various disclosed embodiments. In the example network diagram 100, a plurality of honeypots (HP) 120-1 through 120-N (hereinafter referred to individually as a honeypot 120 and collectively as honeypots 120, merely for simplicity purposes, where N is an integer greater than 1), a detection system 130, one or more devices 140-1 through 140-M (hereinafter referred to individually as device 140 and collectively as devices 140, merely for simplicity purposes, where M is an integer greater than 1), and a database 150 are connected via a network 110. The network may be, but is not limited to, a wireless, cellular, or wired network, a local area network (LAN), a wide area network (WAN), a metro area network (MAN), the Internet, the worldwide web (WWW), similar networks, and any combination thereof.

In the example network diagram 100, the honeypots 120 are shown to be deployed between the devices 140 and the detection system 130 to illustrate their ability to collect and relay device information to the detection system 130 and/or the database 150. However, such illustration does not limit the scope of the disclosed embodiments. The honeypots 120 as well as other components shown in the example network diagram 100 may be arranged in any configuration with connection over the network 110. In an example embodiment, the honeypots 120 are deployed within a network environment that may connect to the devices and/or the detection system 130. In another example embodiment, the honeypot 120 may be on a protecting entity or entities of the detection system 130. It should be noted that the honeypots 120 are configured to be a target of attack from the botnet 145.

The devices 140 are network-connected computing devices that may be accessed and employed as part of a botnet 145. The devices 140 are infected with malicious software under the control of a malicious entity, often without consent and awareness. The devices may include any devices such as, but are not limited to, personal computers, smartphones, tablets, Internet of Things (IoT) devices, routers, modems, printers, scanners, surveillance cameras, home appliances, and the like that have a connection to the network 110. Some other examples of the devices may include network connected microwaves, audio speakers, home security cameras, thermostats, smart locks, smart doorbells, and the like that lack advanced security features and are often easily compromised by a malicious entity.

The malicious entity infects a large group of devices 140, as part of the botnet 145, which may be leveraged to launch massive malicious attacks (i.e., botnet attacks) such as, but not limited to, Distributed Denial-of-Service (DDOS) attacks, phishing campaigns, cryptojacking, credential stuffing attacks, data theft, ransomware distribution, and the like, and any combination thereof. As part of the botnet 145, the devices 140 are configured to send network packets to potential attack targets connected through the network 110 including, but not limited to, one or more honeypots 120, the detection system 130, and a protected entity (not shown). The devices that are leveraged as a member of the botnet may be herein referred to as a botnet device or a botnet attacker.

As the tasks executed by the botnet 145 may be sporadic and require minimal resources from each individual device 140, and as a malicious code executed by the botnet 145 may not require complete dedication from the device 140, the devices 140 may simultaneously contribute to the botnet attack while continuing to operate for its originally intended purpose. It should be noted that a single botnet 145 is shown for illustrative purposes and does not limit the scope of the disclosed embodiments. It should be further noted that devices apart from the botnet 145 (i.e., legitimate devices) may also be communicatively connected to the various components shown in the example network diagram 100.

The plurality of honeypots (HP) 120 may be a component, a server, a system, or the like that is deployed to attract malicious entities and collect attack information. The honeypots 120 may be deployed as a single component or a network of multiple components. In an example embodiment, more than a hundred honeypots 120 are deployed throughout the network environment and activated in various combinations for passive monitoring of network traffic arriving at the honeypots. The honeypots 120 are often hidden from regular, legitimate sources and thus, devices that connect to these honeypots 120 may be potentially malicious. As an example, malicious entities such as botnets are in search of vulnerable resources for exploitation.

The honeypots 120 are configured to accept data packets over the Transmission Control Protocol (TCP) connection from all sources, including the devices 140 of the botnet 145 over the network 110. A 3-way TCP handshake is performed with the sources to collect their network data. It should be noted that the network data of the various devices 140 are gathered through passive monitoring of the incoming traffic to the honeypots 120. In some embodiments, the honeypots 120 are configured to analyze the network data to determine network behaviors such as, but not limited to, roundtrip time (RTT), a rise time, an estimated startup time, and the like, and more of the corresponding device. Data collected and/or processed at the honeypots 120 are provided to the detection system 130 and/or the database 150.

As decoys of the protected entity, the honeypots 120 simulate a vulnerable system or network resource of the protected entity to draw malicious activity, for example, botnet attacks. However, the honeypots 120 and their network are isolated from the critical infrastructure of the protected entity to avoid cybersecurity risks. Furthermore, the segregated honeypots reduce complexity, load, and traffic at the protected entity's infrastructure, even while effectively monitoring network traffic of malicious entities (e.g., botnets). The honeypot may be deployed at different geographical locations with unique network addresses, which may be randomly changed at a predetermined interval. As noted above, the number, IP addresses, and configurations of such honeypots 120 may be readily changed.

The detection system 130 is a component, a server, a system, or the like that is configured to discover botnets 145 and their botnet devices 140. The detection system 130 receives network data from the honeypots 120 which are analyzed to identify one or more devices as botnet attackers. The network traffic data may include, for example, but is not limited to, timestamps, sequence numbers, acknowledgment numbers, time to live (TTL) values, and the like, and any combination thereof as well as metadata of the network packets from the devices 140. Some examples of metadata may include, but are not limited to, source IP address, source ports, geo locations, device fingerprints, user identities, and the like, and more.

In an embodiment, the network data are analyzed to determine the network behaviors of the respective devices, which indicate their participation in a botnet. Some example network behaviors of the sources may be, but are not limited to, roundtrip time (RTT), a rise time, an estimated startup time, and the like, and more. The detection system 130 is configured to group botnet devices based on the analysis and store associated data at the database 150. It should be noted that the discovery of the botnet via the detection system 130 enriches the threat intelligence, particularly botnet knowledge, for improved prediction, response, and management of cyber threats at the protected entities.

According to the disclosed embodiments, the detection system 130 is further configured to monitor and detect botnet activity against protected entities. The detection system 130 monitors incoming network traffic, packets, from devices 140 that are directed to a protected entity to collect and analyze the network behavior. The detection system 130 assesses various information including, for example, but not limited to, network data, network behavior, botnet data stored in the database 150, and the like to identify the botnet devices 140 and their activity. In an embodiment, the database 150 is directly connected to the detection system 130.

The detection is performed in real-time or near real-time as the network packets are received from the device 140. As an example, a device may be identified as a botnet device upon collecting and analyzing packets exchanged in the 3-way TCP handshake. Thus, the botnet devices and the attack may be detected at an early stage of the attack when fewer botnet devices are leveraged. That is, the botnet attack is detected at an initiation phase before the botnet attack is in full force at massive volumes. It should be noted that the rapid detection of botnet activity (or attack) reduces response time and more efficient mitigation. It should be further noted that the conservation of computing resources is achieved through early detection and mitigation before more detrimental damages are caused.

In an embodiment, the detection system 130 is configured to trigger a mitigation action upon identifying the botnet device 140 or a botnet 145 connecting to the honeypot 120 and/or the detection system 130. In some embodiments, the mitigation action may be automatically triggered and executed upon detecting a botnet attack. The mitigation action may be, for example, but is not limited to, generating an alert, updating a threat intelligence database (e.g., at the database 150), blocking traffic based on source IP address, geo-location, etc., sharing botnet information (i.e., definitions), and the like, and more.

It should be noted that the detection system 130 may be deployed either in the cloud computing environment or on-premises, depending on the organization's needs, resources, and preferences. The cloud computing environment may be a public, private, or hybrid cloud. Examples of public cloud computing environments include Amazon® Web Services (AWS), Microsoft Azure, or Google® Cloud Platform (GCP), Cisco® Metacloud, and the like which offer shared infrastructure managed by the cloud provider, providing scalability, flexibility, and reduced infrastructure management. On-premises deployment involves the detection system 130 on the organization's own servers and infrastructure, giving the organization complete control over the environment but also requiring more management and maintenance effort. This option is often chosen for systems with strict security or compliance requirements.

The database 150 such as, but not limited to, data repositories or databases stores above mentioned network data of devices, as well as, botnet data such as, but not limited to, characteristics of a botnet attack including which ports of a target are accessed, timelines of a botnet attack, suspicious IP addresses, and the like. The botnet data may be collected and logged via the detection system 130 to accumulate threat intelligence in the organization. The botnet data may be received from the detection system 130, the honeypots 120, or both. The cybersecurity threats stored in the database 150 may be, for example, periodically updated to store up-to-date information with respect to various threats including, but not limited to, botnet-originated attacks. It should be noted that a single database 150 is shown in FIG. 1 for illustrative purposes and does not limit the scope of the disclosed embodiments. In some configurations, the database 150 may be directly connected to the detection system 130.

A user device (not shown) such as, but not limited to, a personal computer, a laptop, a tablet computer, a smartphone, a wearable computing device, or any other device capable of receiving and displaying notifications may be connected to the detection system 130 and the database 150 over the network 110. The notification may be presented via a graphical user interface (GPU) on the user device as, for example, interactive pages, an alert, a report, and the like, and any combination thereof. A user associated with the protected entity, for example, Security Operation Center (SOC) personnel or the like may access network traffic and/or behavior information, and notifications via the user device. In some implementations, the user may initiate or select mitigation actions to be executed.

Figure 2:
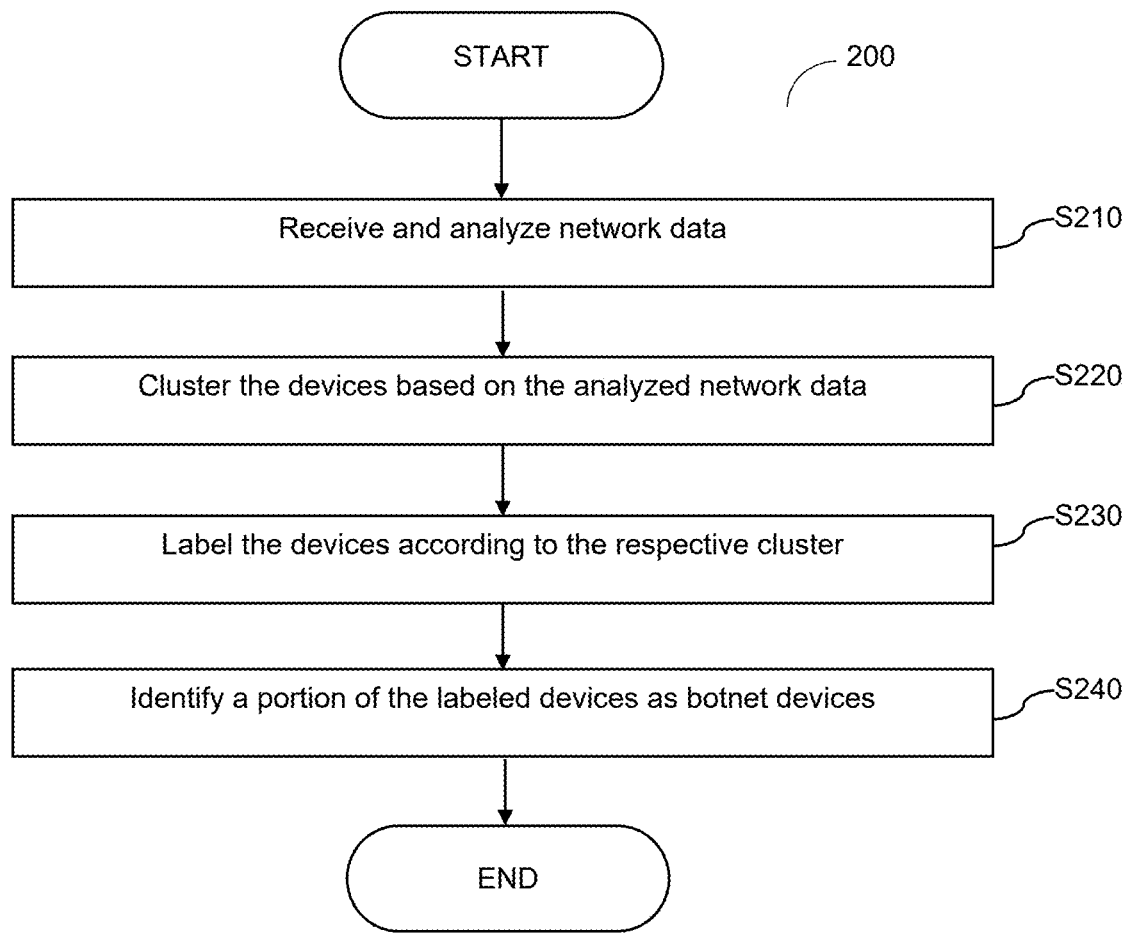
FIG. 2 is a flowchart illustrating a method identifying botnets according to an embodiment.

FIG. 2 is an example flowchart 200 illustrating a method for discovering botnets according to an embodiment. The method described herein is performed in the detection system 130, FIG. 1 that is deployed to detect cybersecurity threats, such as botnet attacks, in communication traffic sent to a protected entity (not shown) and/or honeypots 120, FIG. 1. In an embodiment, the communication traffic is over the Transmission Control Protocol/Internet Protocol (TCP/IP) on the Internet.

At S210, network data of a plurality of devices are received and analyzed. The network data of a device (e.g., the devices 140, FIG. 1) is collected by monitoring the TCP connections between the device and a receiving server. In particular, the 3-way TCP handshake (and packets) is monitored for the network data including, but not limited to, timestamp, sequence number, acknowledgment number, time to live (TTL), and the like, and any combination thereof of the packets. In addition, the network data includes metadata such as, but not limited to, source IP address, source ports, destination IP address, destination ports, geo locations, device fingerprints, user identities, and the like, and more.

In an embodiment, the receiving server is at least one honeypot (e.g., the honeypot 120, FIG. 1) that is deployed to attract malicious sources, such as botnets, for network connections. The honeypot accepts and responds to TCP handshakes in order to collect network data, which are then provided to the detection system (e.g., the detection system 130, FIG. 1). Such network data for the plurality of devices are received and/or retrieved continuously, intermittently, or the like. In an example embodiment, the network data, including their metadata, are received from one or more honeypots at a predetermined time interval.

The plurality of devices that initiate network connections with the honeypot may be a benign entity or a malicious entity. As an example, the device may be a botnet device (i.e., a bot or zombie) of a botnet that is controlled by an attacker. It should be noted that the honeypots independently operate apart from the protected entity and its infrastructure, thereby posing little or no security risks to the protected entity.

In an embodiment, the received network data are analyzed to determine the roundtrip time (RTT), a rise time, an estimated startup time, and the like, of the respective device. The estimated startup time may be defined as a time at which the first value of the TCP/IP sequences is determined and is used to indicate the startup time of the respective device. As an example, the estimated startup time is determined based on the RTT that is derived from packet timestamps and the sequence numbers of the respective device. In an embodiment, the analysis is performed in the honeypot and transmitted to the detection system. In another embodiment, the analysis is performed in the detection system. The network data, their metadata, and the analyzed data for each of the plurality of devices may be stored in a memory and/or a database (e.g., the database 150, FIG. 1).

At S220, the devices are clustered according to the analyzed network data. In an embodiment, the devices are clustered into one or more groups based on the respective estimated startup times of the devices. In an example embodiment, the devices in the same cluster have estimated startup times that are within a predetermined time range, for example, 5 minutes. In some embodiments, distributions of clustered devices with respect to the estimated startup times are determined. The distribution may be represented as a histogram of estimated startup times versus the number of devices in each cluster. The bin size for the histograms is defined as the predetermined time range so that the time resolution is, for example, 5 minutes.

In an embodiment, partially overlapping or closely distributed clusters may be merged as a common cluster. As an example, a merged cluster may include devices with estimated startup times spread out within a 10 to 15 minute time window. Such distribution may be observed in large botnets involving a large volume of devices.

At S230, the devices are labeled based on the cluster it belongs to. The labels define devices within the same cluster displaying a proximate estimated startup time. In an embodiment, each cluster of all clusters is labeled with a unique identifier (ID), and the devices within the cluster are labeled with the corresponding unique ID. In an example embodiment, a device may be associated with one or more clusters and thus, be labeled with one or more labels (e.g., cluster ID). The devices with the same label may be part of the same botnet.

At S240, at least one portion of the labeled devices is identified as botnet devices. The labeled devices are searched in a botnet database (e.g., the database 150, FIG. 1) to match the network data of labeled devices to that of the stored data. As an example, the estimated startup time, destination (e.g., attack target), and the like, and any combination thereof, of the labeled device may be matched to those of the botnet database. The matching labeled devices are verified as botnet devices that are part of an attacker botnet. The matching labeled devices may be a portion of all the labeled devices from S230. The identified botnet devices are stored in association with the matched botnet, for example, with a botnet identifier (ID). Here, network data, metadata, analyzed data, and the like, of the labeled devices are stored together. It should be noted that the distribution and/or statistics of the botnet devices are updated with the matching and associated storage. New members of the botnet may be identified and added for improved accuracy and detection of botnet attacks.

Some labeled devices may not be matched with the devices stored in the database. In such a case, the unmatched labeled devices may be added to the botnet with all relevant data and attributes (e.g., network data, cluster, metadata, analyzed data, etc.). In an example embodiment, the unmatched labeled devices may be processed at subsequent rounds when new network data are received and analyzed. The botnet database may store, for example, but is not limited to, historical botnet data collected from monitoring the network communications, commonly known botnets in the cloud service, and the like, and more. In an embodiment, the botnet database may be a standalone database or a part of the larger database; and communicates with the detection system and/or the honeypots over the network.

In some embodiments, each cluster or merged clusters of the same botnet are characterized for additional parameters such as, but not limited to, cluster size (i.e., number of devices in the botnet cluster), ramp-up time, geo location, working hours, known reputations from security systems, attack tactics and techniques, and the like, and any combination thereof. Such characterized parameters of the respective cluster (i.e., botnet) may be stored in the database (e.g., the database 150, FIG. 1), for example, as part of the botnet database. The characterization parameters, as well as the database in general, may be updated with, for example, and without limitation, additional data of the botnet, added devices to the botnet, and more. It should be noted that the database is enriched with incoming information of devices, botnets, their behaviors, and more. To this end, threat intelligence of various cybersecurity risks, and particularly botnet threats, are deepened for efficient threat prevention and response. It should be further noted that the clustered identification of potential botnet devices enables rapid and accurate discovery leveraging on botnet attack characteristics that exploit at massive volumes, thereby conserving computational power and time.

In some implementations, a mitigation action such as, but not limited to, generating a report, causing a warning alert, updating threat knowledge (e.g., the botnet database 150, FIG. 1), blocking botnet devices, performing a risk assessment, modifying traffic rate, and the like, and any combination thereof is triggered to be executed. In a further embodiment, the discovered botnet and respectively updated database are utilized for detecting and preventing real-time botnet attacks against the protected entity. In some implementations, the mitigation action may be determined based on a plurality of mitigation rules based on botnet characteristic parameters, timestamp, cluster size, and the like, and any combination thereof. In some other implementations, the mitigation action may be automatically triggered, provided to a user, for example, via a user device, or both.

Figure 3:
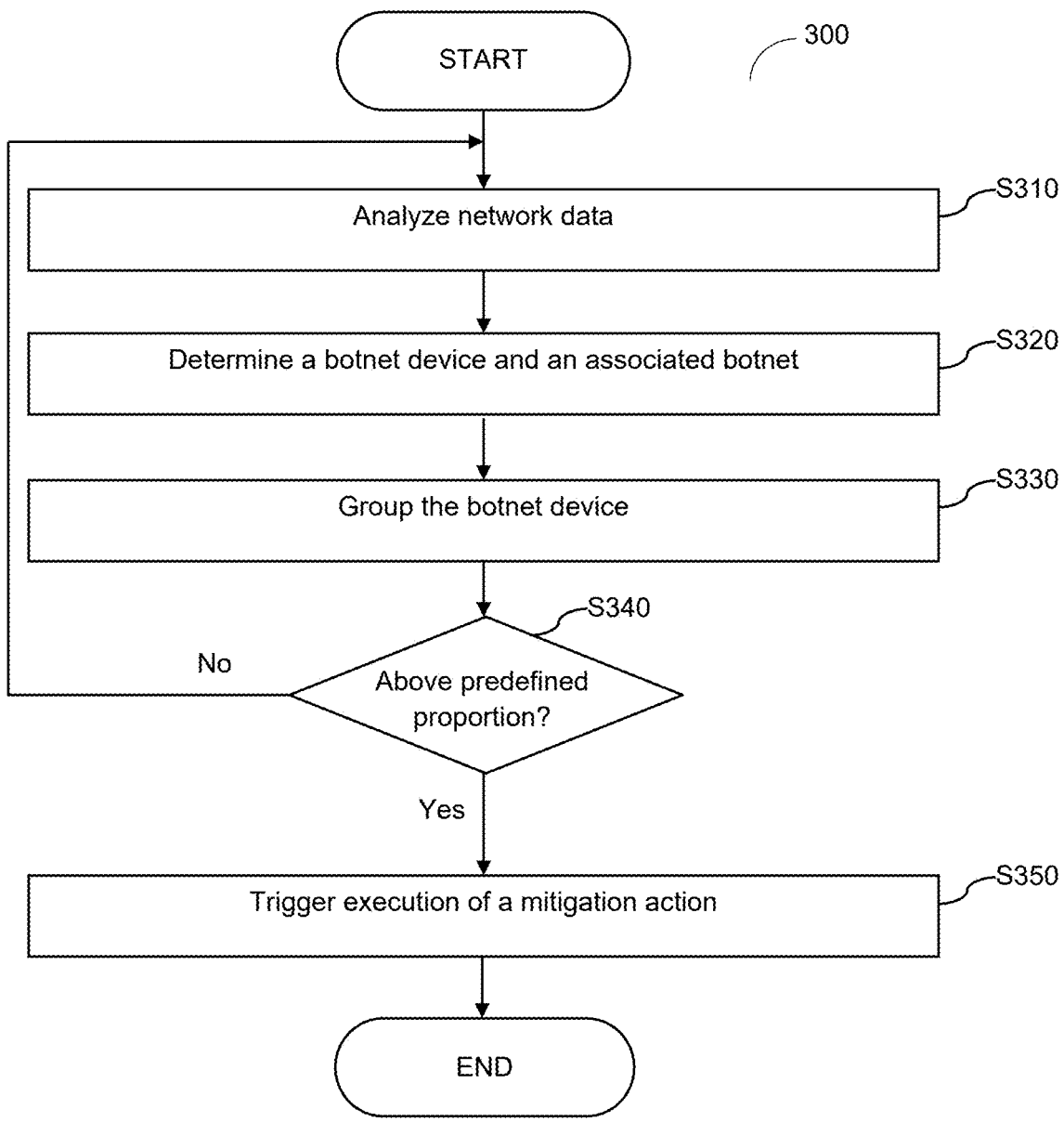
FIG. 3 is a flowchart illustrating a method for determining a botnet activity according to an embodiment.

FIG. 3 is an example flowchart 300 illustrating a method for detecting a botnet activity according to an embodiment. The method described herein is performed at the detection system 130, FIG. 1. The method is described with respect to one botnet for illustrative purposes and does not limit the scope of the disclosed embodiments. The method may be performed for multiple botnets simultaneously upon receiving network connections from one or more devices. In an embodiment, the method of detecting the botnet may be performed at a sufficiently fast rate, real-time or near real-time, to efficiently respond to botnet-originated cybersecurity threats at the protected entity infrastructure.

At S310, network data for devices are analyzed. The network data from one or more devices are collected from their network traffic in establishing the connection, for example via TCP/IP. In an embodiment, the network traffic to connect to the target protected entity is monitored by a detection system (e.g., the detection system 130, FIG. 1) in order to receive network data. In another embodiment, the network traffic is monitored and received from one or more honeypots (e.g., the honeypots 120, FIG. 1). It should be noted that the detection system monitors real-time traffic, from benign or malicious sources, that are being sent to the protected entity. That is, the network data is collected from botnet devices (or sources) with malicious intent or legitimate devices accessing the protected entity.

The network data are analyzed as described in S210, FIG. 2 to determine, for example, but not limited to, a RTT, a rise time, an estimated startup time, and the like, of the respective botnet device. Such network data may include, for example, but is not limited to, timestamp, sequence number, acknowledgment number, time to live (TTL), and the like, and any combination thereof of the packets exchanged for 3-way TCP handshake and metadata such as, but not limited to, source IP address, source ports, destination IP address, geo locations, device fingerprints, user identities, and the like, and more. In some embodiments, the network data analyzed in S210 may be used without additional analysis.

At S320, a botnet device and an associated botnet are determined from the monitored devices. The network data of the devices are mapped to botnet data stored in the database (e.g., the database 150, FIG. 1). In an embodiment, the monitored device that matches a member of at least one botnet in the database is determined as the botnet device of the matched botnet. As an example, the attack patterns (e.g., network behavior), attack target, and the like are matched. The botnet devices of the same botnet would target the same destination for attack. In a further embodiment, the mapped botnet device is labeled, for example with a botnet identifier (ID) of the matched botnet. In an embodiment, the determined botnet device, associated botnet, the network data, metadata, and the like. and any combination thereof are logged in the database as part of the stored botnets, as well as with respect to the associated botnet. In some implementations, the analyzed network data may also be used, for example, in combination with the network data for determination.

The botnet data are threat knowledge such as, but not limited to, historical data of identified botnets, historical data from other detection tools, knowledge from external sources (e.g., cloud services, etc.), and the like, and more. In an embodiment, portions of the device data which includes network data, analyzed network data, metadata, and the like, are mapped to botnet data stored in the database. As an example, attack type and parameters, network behavior, target IP address, and the like of the monitored device may be matched to the botnet data in the database.

At S330, the botnet device is grouped with the associated botnet. The devices that are determined as botnet devices are grouped with other botnet devices of the same botnet. In an example embodiment, the grouped botnet devices may be observed within a predetermined time window that suggests a botnet attack. The predetermined time window may range from minutes to hours depending on the type of attack. In an example embodiment, the predetermined time window may be defined by observing an end time of the attack.

At S340, it is checked whether the group includes botnet devices above a predefined proportion. If so, the operation continues with S350; otherwise, the operation continues with S310 to continue monitoring and analyzing incoming network traffic, for example, towards the protected entity.

In an embodiment, the predefined proportion is a fractional portion of a total volume or number of expected members of the botnet. For example, the total volume may be estimated, known, or the like, and may be specific to certain botnets. The total volume or number of known members may differ between the botnets. In an example embodiment, the predefined proportion may be 10%. Once the group includes 10% of the total number of members of the respective botnet, a botnet attack may be declared. If the number of botnet devices in the group is less than the predefined proportion, the network traffic is monitored to identify other botnet devices (or members) of the specific group. It should be noted that botnet devices above a predefined proportion show rising attack activity of the corresponding botnet to the protected target entity.

At S350, execution of a mitigation action is triggered. The mitigation action is executed on a portion or all of the identified botnet devices based on a plurality of mitigation rules that includes, for example, weights, ranks, and the like, of various characteristic parameters such as, but not limited to, the botnet identifier (ID), the proportion of identified botnet attackers, type of attack, and the like, and any combination thereof. As an example, the response to a first botnet involved in data theft and a second botnet involved in social engineering will be different based on, for example, type of attack, botnet ID, and the like. In an embodiment, the mitigation action may be automatically triggered based on the plurality of mitigation rules. In an example embodiment, the mitigation of botnet attackers may be prioritized between different botnet groups and/or within the same botnet group.

Some mitigation actions include, but are not limited to, generating a notification, triggering an alert warning, blocking traffic from the associated source IP address, geoblocking of traffic from botnet geographical locations, updating the database (e.g., the database 150, FIG. 1) with confirmed botnet devices, generating a reputation feed of source IP addresses, sending botnet information (i.e., definitions) to cloud services, and the like, and more. The mitigation action may include any defense action to respond, mitigate, or restore potential damages from botnet threats.

In some embodiments, steps S320 through S350 may be performed followed by the method described in FIG. 2. Once the botnet devices are identified in S240, the identified botnet devices are searched in the database for the associated botnet. As an example, a common target destination may be utilized to map the identified botnet device to a unique botnet. The operation continues to group botnet devices, detect attacks, and trigger at least one mitigation action in response to the detected attack. It should be appreciated that such processing of identified botnet devices enables efficient botnet detection and strong protection against potential cybersecurity threats.

According to the disclosed embodiments, the botnet devices and potential botnet attacks are rapidly detected at an early stage of the attack. It has been identified that botnet attacks are often initiated with a relatively smaller fractional group of botnet devices followed by a much larger group of botnets for attacks such as, but not limited to, Distributed Denial of Service (DDOS) attacks, spam campaigns, credential stuffing, data theft, and the distribution of malware, and the like. The disclosed embodiments passively monitor and collect network data to predict botnet attacks before the attack reaches its full power. It should be noted that such early detection and response allows effective and efficient mitigation of attacks at reduced computational load. Moreover, less damage from the attack leads to faster and easier recovery of the affected entity. In an embodiment, the mitigation action may be triggered according to botnet data, for example, characteristic parameters, and the like, in order to effectively apply botnet specific mitigation actions.

Figure 4:
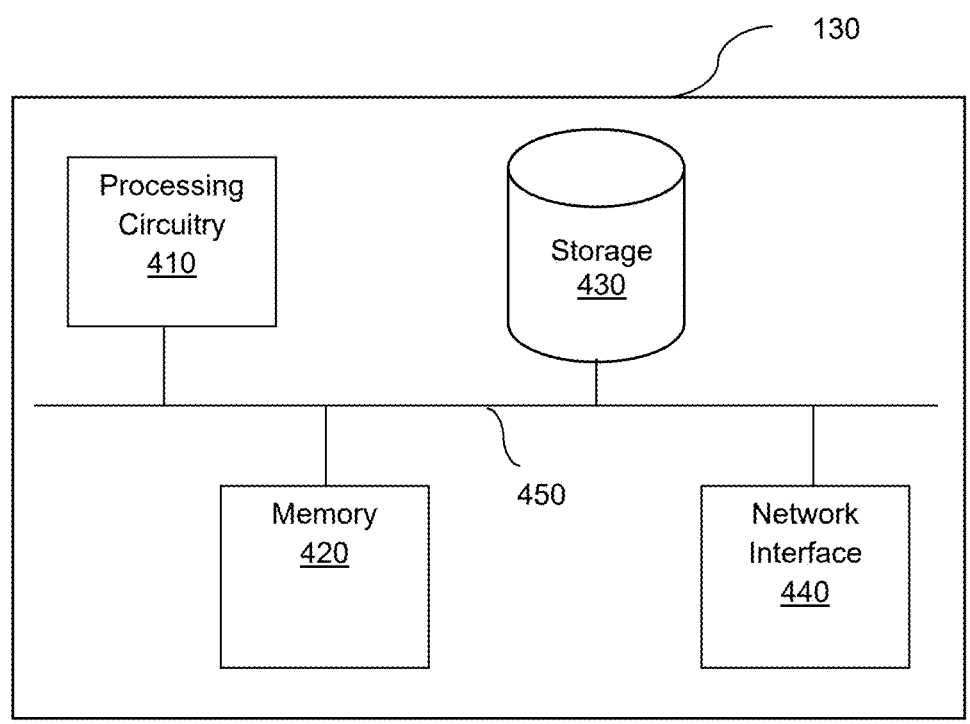
FIG. 4 is a schematic diagram of a detection system according to an embodiment.

FIG. 4 is an example schematic diagram of a detection system 130 according to an embodiment. The detection system 130 includes a processing circuitry 410 coupled to a memory 420, a storage 430, and a network interface 440. In an embodiment, the components of the detection system 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the detection system 130 to communicate with, for example, the honeypots 120, the database 150, and the like.

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting botnets, comprising: monitoring a network traffic to collect network data for
a device, wherein the network traffic is directed to at least one honeypot of a plurality of honeypots, wherein the plurality of honeypots are segregated from protected entities;
mapping the device to members of at least one stored group of botnet devices, wherein the mapping matches a network data of the device to network data of the members of the at least one stored group of botnet devices;
determining the mapped device as a botnet device of an associated botnet upon matching the network data of the device to a network data of a member of the associated botnet, wherein the associated botnet is the at least one stored botnet, wherein the network data includes an estimated startup time of the member;
discovering members of at least one stored group of botnet devices by analyzing respective estimated startup times of the discovered members; and
logging the network data of the mapped device as being part of the associated botnet of the at least one stored grouped set of botnet devices;
and triggering execution of a mitigation action on the associated botnet in response to determination that the number of members of the grouped set of botnet devices exceed a predefined proportion of a total number of expected members of the botnet.

2. The method of claim 1, further comprising:
grouping the determined botnet device with respect to the associated botnet; and
determining that the group of the associated botnet has at least a predefined proportion of members, wherein the members are botnet devices employed by the associated botnet.

3. The method of claim 2, further comprising:
declaring a botnet activity upon determining that the group has the at least a predefined proportion of members.

4. The method of claim 1, wherein the network data is collected from packets exchanged in a 3-way TCP handshake.

5. The method of claim 1, wherein the monitored network traffic is towards a protected entity.

6. The method of claim 1, wherein the discovering further comprises:
analyzing network data for a plurality of devices;
clustering the plurality of devices based on the analyzed network data for each of the plurality of devices, wherein a cluster has devices with proximate analyzed network data;
labeling the devices of the cluster with respect to the cluster; and
identifying at least a portion of the labeled devices as the members of the at least one stored botnet, wherein a stored botnet of the at least one stored botnet has devices with a same label.

7. The method of claim 6, wherein the analyzed network data includes at least one of: a roundtrip time (RTT), and a rise time.

8. The method of claim 6, wherein network data for the plurality of devices for the analyzing is collected from at least one honeypot.

9. A non-transitory computer readable medium having stored thereon instructions for causing a processing circuitry to execute a process, the process comprising:
monitoring a network traffic to collect network data for a device, wherein the network traffic is directed to at least one honeypot of a plurality of honeypots, wherein the plurality of honeypots are segregated from protected entities;
mapping the device to members of at least one stored group of botnet devices, wherein the mapping matches a network data of the device to network data of the members of the at least one stored group of botnet devices;

determining the mapped device as a botnet device of an associated botnet upon matching the network data of the device to a network data of a member of the associated botnet, wherein the associated botnet is the at least one stored botnet, wherein the network data includes an estimated startup time of the member;

discovering members of at least one stored botnet by analyzing respective estimated startup times of the discovered members of the at least one stored group of botnet devices; and logging the network data of the mapped device as being part of the associated botnet of the at least one stored group of botnet devices; and triggering execution of a mitigation action on the associated botnet in response to determination that the number of members of the grouped set of botnet devices exceed a predefined proportion of a total number of expected members of the botnet.

10. A system for detecting botnets, comprising: a processing circuitry; and a memory, the memory containing instructions that, when executed by the processing circuitry, configure the system to:

monitor a network traffic to collect network data for a device, wherein the network traffic is directed to at least one honeypot of a plurality of honeypots, wherein the plurality of honeypots are segregated from protected entities;

map the device to members of at least one stored group of botnet devices, wherein the mapping matches a network data of the device to network data of the members of the at least one stored group of botnet devices;

determine the mapped device as a botnet device of an associated botnet upon matching the network data of the device to a network data of a member of the associated botnet, wherein the associated botnet is the at least one stored botnet, wherein the network data includes an estimated startup time of the member;

discover members of at least one stored group of botnet devices by analyzing respective estimated startup times of the discovered members of the at least one stored group of botnet devices; and log the network data of the mapped device as being part of the associated botnet of the at least one stored group of botnet devices; and triggering execution of a mitigation action on the associated botnet in response to determination that the number of members of the grouped set of botnet devices exceed a predefined proportion of a total number of expected members of the botnet.

11. The system of claim 10, wherein the system is further configured to:

group the determined botnet device with respect to the associated botnet; and determine that the group of the associated botnet has at least a predefined proportion of members, wherein the members are botnet devices employed by the associated botnet.

12. The system of claim 11, wherein the system is further configured to:

declare a botnet activity upon determining that the group has the at least a predefined proportion of members.

13. The system of claim 10, wherein the network data is collected from packets exchanged in a 3-way TCP handshake.

14. The system of claim 10, wherein the system is further configured to:

analyze network data for a plurality of devices;

cluster the plurality of devices based on the analyzed network data for each of the plurality of devices, wherein a cluster has devices with proximate analyzed network data;

label the devices of the cluster with respect to the cluster; and identify at least a portion of the labeled devices as the members of the at least one stored botnet, wherein a stored botnet of the at least one stored botnet has devices with a same label.

15. The system of claim 14, wherein the analyzed network data includes at least one of: a roundtrip time (RTT), and a rise time.

16. The system of claim 14, wherein network data for the plurality of devices for the analyzing is collected from at least one honeypot.

* * * * *